United States Patent
Dar et al.

(10) Patent No.: US 12,353,552 B2
(45) Date of Patent: Jul. 8, 2025

(54) ZERO-TRUST REMOTE REPLICATION

(71) Applicant: DELL PRODUCTS L.P., Hopkinton, MA (US)

(72) Inventors: Yaron Dar, Sudbury, MA (US); Arieh Don, Newton, MA (US); Krishna Deepak Nuthakki, Bangalore (IN)

(73) Assignee: DELL PRODUCTS L.P., Hopkinton, MA (US)

( * ) Notice: Subject to any disclaimer, the term of this patent is extended or adjusted under 35 U.S.C. 154(b) by 374 days.

(21) Appl. No.: 17/968,847

(22) Filed: Oct. 19, 2022

(65) Prior Publication Data

US 2024/0134985 A1 Apr. 25, 2024
US 2024/0232358 A9 Jul. 11, 2024

(51) Int. Cl.
*G06F 21/56* (2013.01)

(52) U.S. Cl.
CPC ...... *G06F 21/568* (2013.01); *G06F 2221/033* (2013.01)

(58) Field of Classification Search
CPC ...... G06F 21/56; G06F 21/565; G06F 21/567; G06F 21/568; G06F 21/60; G06F 21/604
See application file for complete search history.

(56) References Cited

U.S. PATENT DOCUMENTS

| | | | |
|---|---|---|---|
| 9,652,326 B1 * | 5/2017 | Bauer | G06F 11/2035 |
| 10,459,632 B1 * | 10/2019 | Chen | G06F 3/0616 |
| 11,061,609 B2 * | 7/2021 | Beauchamp | G06F 3/0644 |
| 11,531,474 B1 * | 12/2022 | Matsushita | G06F 3/0619 |
| 11,593,186 B2 * | 2/2023 | Niles | G06F 12/1009 |
| 11,716,382 B2 * | 8/2023 | Longinov | G06F 12/16 709/223 |
| 11,995,041 B2 * | 5/2024 | Kaushik | G06F 3/067 |
| 12,050,553 B2 * | 7/2024 | Curtis-Maury | G06F 3/0643 |

* cited by examiner

*Primary Examiner* — Hosuk Song
(74) *Attorney, Agent, or Firm* — Anderson Gorecki LLP

(57) ABSTRACT

A disaster recovery site storage array causes an instance of a host application or selected executables running on a host server to validate changes to an asynchronously updated replica of a storage object. Snapshots of the replica are generated before and after each set of changes to the replica are received from a remote storage array. Validation is performed by mounting snapshots to the instance of the associated host application and causing the host application instance to validate the data. If a snapshot is determined to be invalid, then the replica to recovered with the most recent known-valid snapshot. Alternatively, if each set of changes is validated prior to being applied to the replica, invalid changes are not applied to the replica. Unvalidated snapshots may be accumulated and validated independently from application of sets of changes to the replica, thereby decoupling validation from replication.

20 Claims, 4 Drawing Sheets

ZERO-TRUST REMOTE REPLICATION

TECHNICAL FIELD

The subject matter of this disclosure is generally related to detection of malicious encryption or corruption of remotely replicated data.

BACKGROUND

Institutional data storage systems such as storage area networks (SANs) and storage arrays are used to maintain storage objects for use by instances of host applications that run on host servers. Examples of host applications may include, but are not limited to, software for email, accounting, manufacturing, inventory control, and a wide variety of other institutional processes. A network of specialized, interconnected compute nodes responds to IOs from the host application instances and manage access to arrays of non-volatile drives on which the host application data is stored. Each storage object is a logical storage device that abstracts the drives. A separate storage object or group of storage objects may be created for each host application.

It is known to configure multiple storage arrays to mirror storage objects in order to maintain data availability and avoid data loss. Production storage objects can be synchronously replicated by primary and secondary storage arrays so that the primary storage array can quickly failover to the secondary storage array. Production storage objects can be asynchronously replicated at a disaster recovery site storage array for use in the event of a disaster at the primary and secondary sites. However, the low latency requirements of replication complicate detection of data corruption and malicious encryption. For example, a compromised primary storage array that is targeted by a ransomware attack may distribute maliciously encrypted data for remote replication before the attack is detected, thereby spreading the damage to multiple storage arrays.

SUMMARY

A method in accordance with some implementations comprises: receiving, from a first or second storage system, a set of changes to an asynchronously replicated storage object; generating an unvalidated snapshot that contains the set of changes; and performing validation on the unvalidated snapshot.

An apparatus in accordance with some implementations comprises: a plurality of compute nodes than manage access to an array of non-volatile drives on which data of an asynchronously replicated storage object is stored, at least one of the compute nodes configured to receive a set of changes to the asynchronously replicated storage object from a remote storage system, generate an unvalidated snapshot that contains the set of changes, and prompt performance of validation on the unvalidated snapshot.

In accordance with some implementations, a non-transitory computer-readable storage medium stores instructions that when executed by a storage array compute node perform a method comprising: receiving, from a first or second storage system, a set of changes to an asynchronously replicated storage object; generating an unvalidated snapshot that contains the set of changes; and prompting performance of validation on the unvalidated snapshot.

This summary is not intended to limit the scope of the claims or the disclosure. Other aspects, features, and implementations will become apparent in view of the detailed description and figures. Moreover, all the examples, aspects, implementations, and features can be combined in any technically possible way.

DETAILED DESCRIPTION

The terminology used in this disclosure is intended to be interpreted broadly within the limits of subject matter eligibility. The terms "disk," "drive," and "disk drive" are used interchangeably to refer to non-volatile storage media and are not intended to refer to any specific type of non-volatile storage media. The terms "logical" and "virtual" are used to refer to features that are abstractions of other features, for example, and without limitation, abstractions of tangible features. The term "physical" is used to refer to tangible features that possibly include, but are not limited to, electronic hardware. For example, multiple virtual computers could operate simultaneously on one physical computer. The term "logic" is used to refer to special purpose physical circuit elements, firmware, software, computer instructions that are stored on a non-transitory computer-readable medium and implemented by multi-purpose tangible processors, and any combinations thereof. Aspects of the inventive concepts are described as being implemented in a data storage system that includes host servers and a storage array. Such implementations should not be viewed as limiting. Those of ordinary skill in the art will recognize that there are a wide variety of implementations of the inventive concepts in view of the teachings of the present disclosure.

Some aspects, features, and implementations described herein may include machines such as computers, electronic components, optical components, and processes such as computer-implemented procedures and steps. It will be apparent to those of ordinary skill in the art that the computer-implemented procedures and steps may be stored as computer-executable instructions on a non-transitory computer-readable medium. Furthermore, it will be understood by those of ordinary skill in the art that the computer-executable instructions may be executed on a variety of tangible processor devices, i.e., physical hardware. For practical reasons, not every step, device, and component that may be part of a computer or data storage system is described herein. Those of ordinary skill in the art will recognize such steps, devices, and components in view of the teachings of the present disclosure and the knowledge generally available to those of ordinary skill in the art. The corresponding machines and processes are therefore enabled and within the scope of the disclosure.

Figure 1:
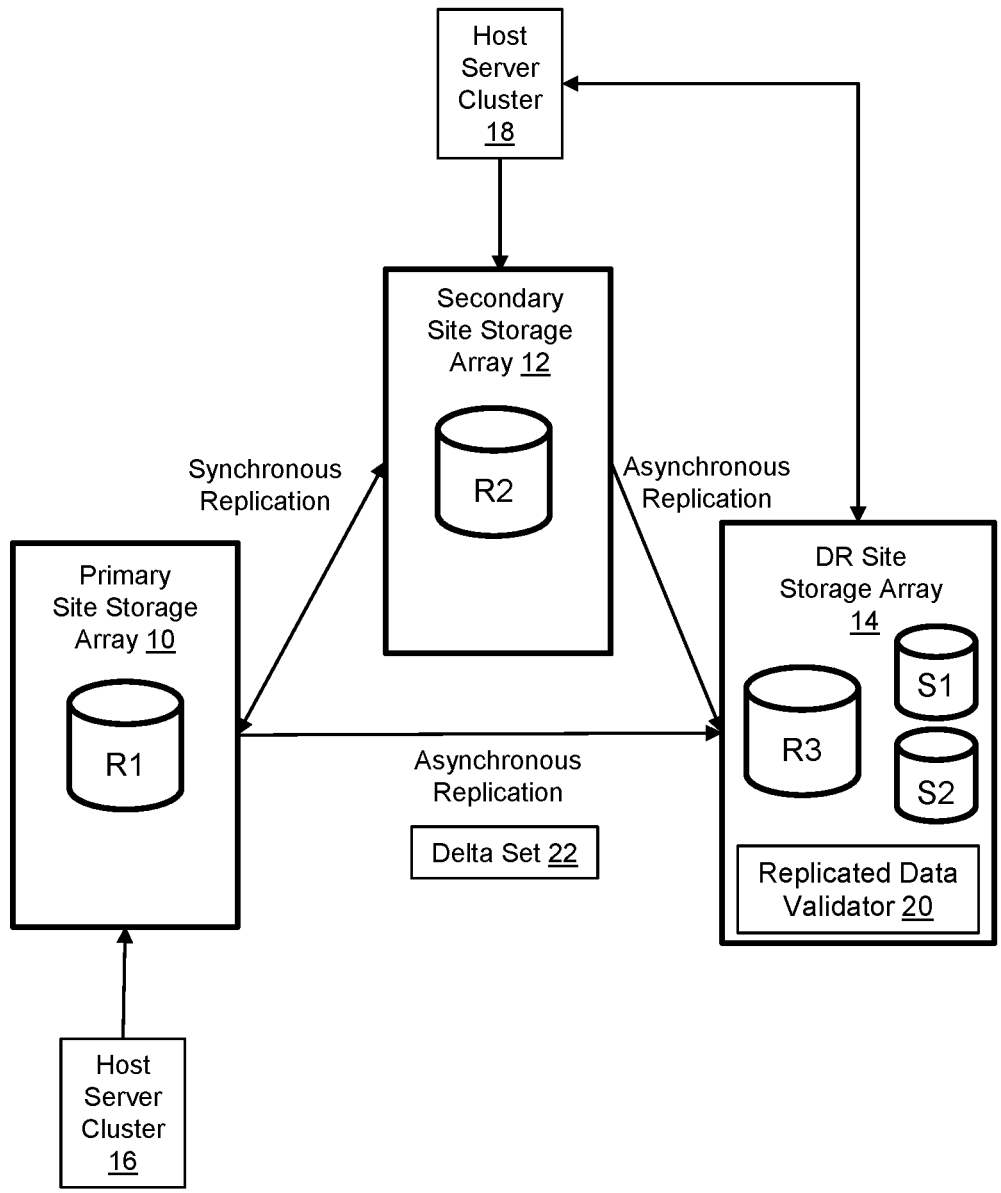
FIG. 1 illustrates a storage system in which a disaster recovery storage array manages validation of replicated data.

FIG. 1 illustrates a storage system in which a disaster recovery site storage array 14 causes a host application instance running on a host server to validate replicated data received from other storage arrays. The disaster recovery site storage array 14 is configured to asynchronously replicate data of a replicated storage object that is maintained by a primary site storage array 10 and a secondary site storage array 12. The replicated storage object contains host application data that is used by instances of a host application running on host servers that include volatile memory, non-volatile storage, and one or more tangible processors. A first replica R1 of the storage object is maintained on the primary site storage array. A second replica R2 of the storage object is maintained on the secondary site storage array. A third replica R3 of the storage object is maintained on the disaster recovery site storage array. The first replica R1 may be a production storage object that is actively accessed by host servers in host server cluster 16. The second replica R2 may be a production or failover storage object that is actively accessed or ready to be actively accessed by host servers in a host server cluster 18. The third replica R3 may be maintained for disaster recovery. Replica R1 and replica R2 are updated synchronously, whereas replica R3 is updated asynchronously. The secondary site storage array could be active or passive, while the primary site storage array is active.

Updates to the replicated storage object are accumulated by the primary site storage array 10 and possibly the secondary site storage array 12 and periodically sent to the disaster recovery site storage array 14 for asynchronously updating the third replica R3. Each set of accumulated updates, known as a delta set, represents changes resulting from operations such as write IOs to the replicated storage object by the host application instances running in the host server clusters. Each individual delta may include a storage object ID, a front-end track (FE-TRK) logical block address (LBA), a timestamp, and the host application data associated with the IO. Delta sets may be generated and transmitted at fixed time intervals, e.g., every 5 seconds, 10 seconds, 30 seconds, or some other time period. Unlike snapshots, delta sets do not require an external action or request to initiate the creation of a snap volume, cessation of IOs to the storage object, or comparison of two storage objects to identify differences. Consequently, delta sets are created and transmitted via normal storage array processing and can be created more frequently than snapshots without overloading the storage array and disrupting host applications. Unlike continuous data protection, delta sets do not necessarily include all changes that occur during the time interval. For example, if a block is updated three times during a 15 second delta set generation interval, then only the last update is included in the delta set.

The disaster recovery site storage array 14 uses the delta sets sent from the other storage arrays for validation of replicated data. Validation is performed to detect data corruption and malicious data encryption associated with a ransomware attack. At some point in time prior to applying a delta set 22 to update replica R3, the disaster recovery site storage array 14 generates a "crash-consistent" snapshot S1 of replica R3. Snapshot S1 is considered to be crash-consistent because all delta set updates prior to generation of snapshot S1 have been persisted. Therefore, S1 contains only consistent data. After receiving delta set 22, the disaster recovery site storage array 14 applies the delta set changes to replica R3. A new snapshot S2 of replica R3 is generated after the changes have been applied to R3. The replicated data validator 20 causes the new snapshot S2 to be mounted to a host application instance on a host server in host server cluster 18. The replicated data validator causes that host application instance to perform validation on the new snapshot S2. The snapshot represents the entire replicated storage object but may contain only the changes since the previous snapshot. If the new snapshot S2 is determined to be invalid, then replica R3 is recovered using the most recent known-valid snapshot S1. Procedures for recovering R1, R2, or both may also be implemented. If snapshot S2 is determined to be valid, then the update-and-validate procedure is repeated for the next delta set using validated snapshot S2 as the crash-consistent snap and generating a new snapshot S3 for validation after applying the updates associated with the new delta set.

Figure 2:
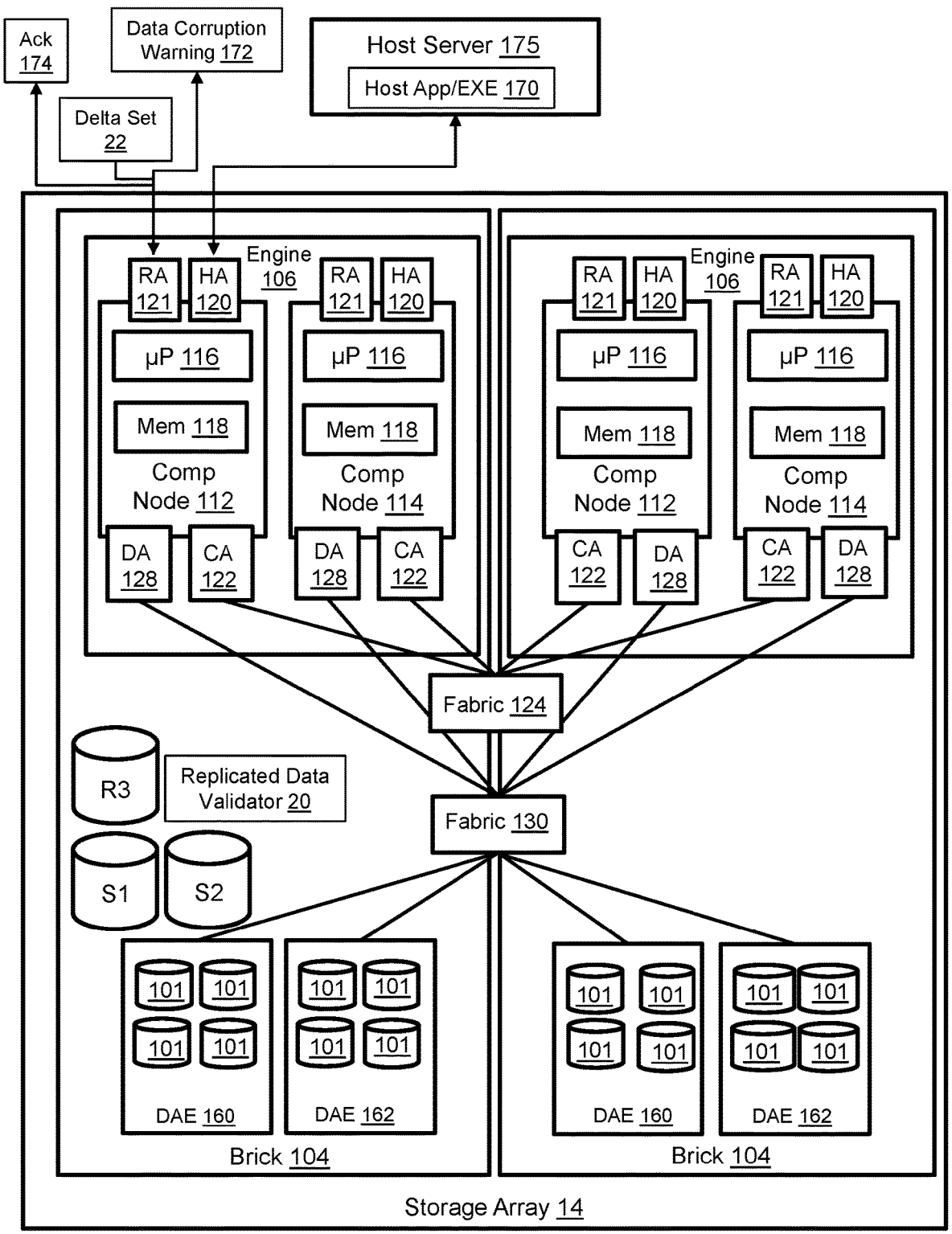
FIG. 2 illustrates the disaster recovery storage array in greater detail.

FIG. 2 illustrates the disaster recovery storage array 14 in greater detail. The storage array includes one or more bricks 104. Each brick 104 includes an engine 106 and one or more disk array enclosures (DAEs) 160, 162. In the illustrated example there are only two engines, but the storage array could include a greater number of engines. Each engine 106 includes two interconnected compute nodes 112, 114 that are arranged as a mirrored pair for failover and may be referred to as "storage directors." Although it is known in the art to refer to the compute nodes of a SAN as "hosts," that naming convention is avoided in this disclosure to help distinguish the network server hosts from the compute nodes 112, 114. Each compute node is implemented as a separate PCB or blade and includes resources such as at least one multi-core processor 116 and local memory 118. The processor may include central processing units (CPUs), graphics processing units (GPUs), or both. The local memory 118 may include volatile media such as dynamic random-access memory (DRAM), non-volatile memory (NVM) such as storage class memory (SCM), or both. Each compute node allocates a portion of its local memory to a shared memory that can be accessed by all compute nodes of the storage array using direct memory access (DMA). Each compute node includes one or more host adapters (HAs) 120 for communicating with host servers. Each host adapter has resources for servicing input-output commands (IOs) from host servers. The host adapter resources may include processors, volatile memory, and ports via which the hosts may access the storage array. Each compute node also includes a remote adapter (RA) 121 for communicating with other storage systems, e.g., the other storage arrays for exchanging delta sets for replication. Each compute node also includes one or more disk adapters (DAs) 128 for communicating with managed drives 101 in the DAEs 160, 162. Each disk adapter has processors, volatile memory, and ports via which the compute node may access the DAEs for servicing IOs. Each compute node may also include one or more channel adapters (CAs) 122 for communicating with other compute nodes via an interconnecting fabric 124. The managed drives 101 include non-volatile storage media that may be of any type, e.g., solid-state drives (SSDs) based on EEPROM technology such as NAND and NOR flash memory and hard disk drives (HDDs) with spinning disk magnetic storage media. Disk controllers may be associated with the managed drives as is known in the art. An interconnecting fabric 130 enables implementation of an N-way active-active backend. A backend connection group includes all disk adapters that can access the same drive or drives. In some implementations every disk adapter 128 in the storage array can reach every DAE via the fabric 130. Further, in some implementations every disk adapter in the storage array can access every managed disk 101. Delta set 22 is received via the RA 121.

The replicated data validator 20, which may be implemented as software, may be distributed across multiple engines, or run on a subset of the engines using the processing and memory resources of the compute nodes. The replicated data validator 20 can cause snapshots to be mounted to an instance of the host application associated with the replicated storage object or selected executables thereof, collectively host app/EXE 170, running on host server 175. Snapshot S2 is validated the replicated data validator 20 causing the host app/EXE 170 to mount S2 and run a data validation procedure. For example, a database host application can be caused to run a database validation routine. Failure to validate a snapshot may prompt generation of a data corruption warning 172 that is sent to the other storage arrays to prompt recovery of the replicated storage object to a prior, valid state. Validation of a snapshot may prompt generation of a validation acknowledgement 174 that is sent to the other storage arrays.

Figure 3:
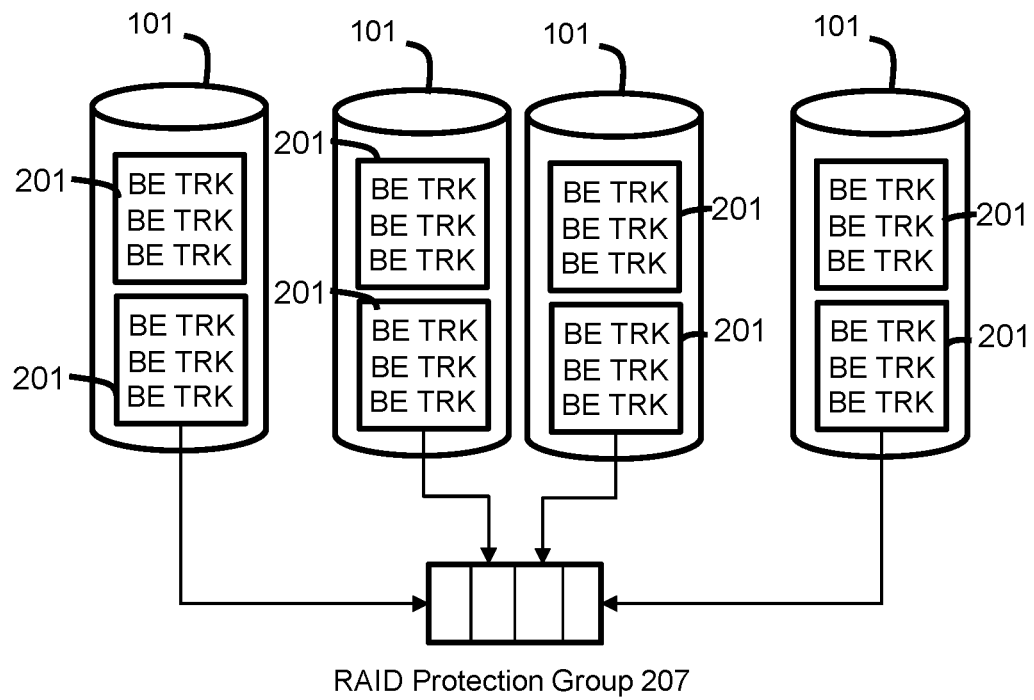
FIG. 3 illustrates layers of abstraction between the managed drives and storage objects of a storage array.
Figure 3:
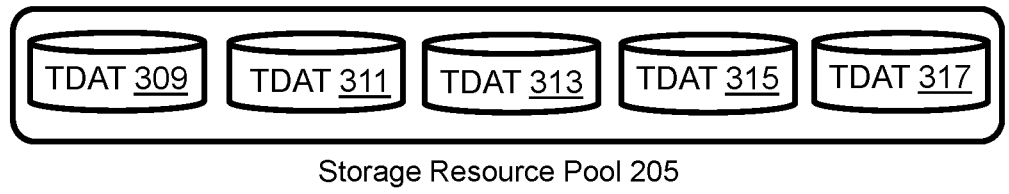
Figure 3:
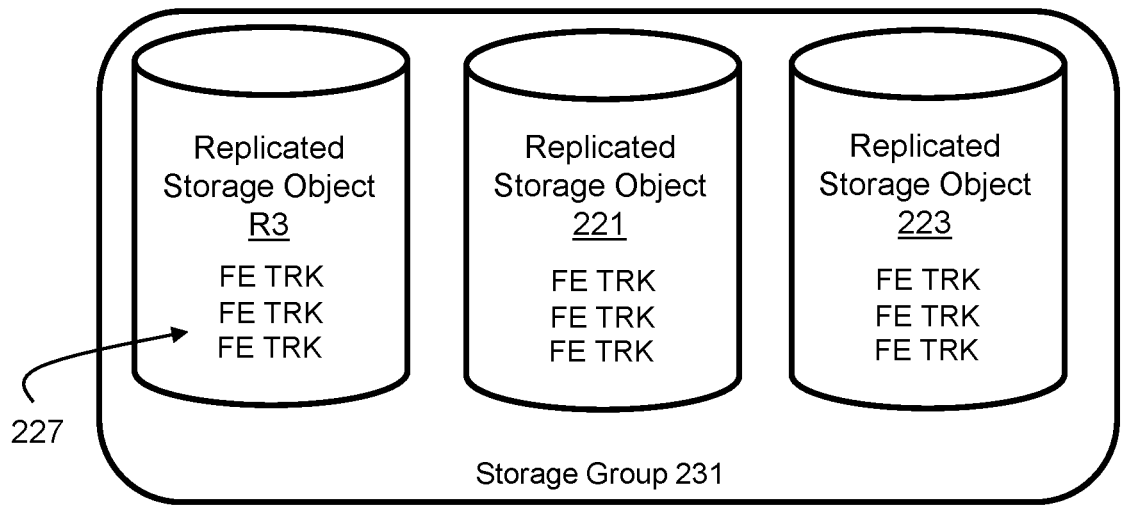

Referring to FIGS. 2 and 3, the host application data that is logically stored on replica R3 is persistently stored on the managed drives 101. Without limitation, storage objects such as R3 may be referred to as volumes, devices, or LUNs, where a logical unit number (LUN) is a number used to identify logical storage volumes in accordance with the small computer system interface (SCSI) protocol. From the perspective of the host servers, each production storage object is a single disk having a set of contiguous logical block addresses (LBAs) on which data used by the instances of a host application resides. However, the host application data is stored at non-contiguous addresses on various managed drives 101. A storage group 231 of multiple replicated storage objects, including replica R3, replicated storage object 221, and replicated storage object 223, may be created for an individual host application. Multiple instances of a single host application may use data from the same storage group, but instances of different host applications do not use data from the same storage group. The storage array may maintain a large number of production storage objects and storage groups.

The compute nodes 112, 114 maintain metadata that maps between the LBAs of the production storage objects (replica R3, 221, 223) and physical addresses on the managed drives 101. The basic allocation unit of storage capacity that is used by the compute nodes 112, 114 to access the managed drives 101 is a back-end track (BE TRK). The managed drives may be configured with partitions or splits 201, each of which may contain multiple BE TRKs. A group of partitions or splits from different managed drives is used to create a RAID protection group 207. A storage resource pool 205 is a storage object that includes a collection of RAID protection groups 207 of the same type, e.g., RAID-5 (3+1). Storage resource pools are used to create the production storage objects (replica R3, 221, 223). The host application data is logically stored in front-end tracks (FE TRKs) on the production storage objects. The FE TRKs are mapped to the BE TRKs and vice versa by FE TRK IDs and BE TRK IDs, which are pointers that are maintained in the shared memory.

Figure 4:
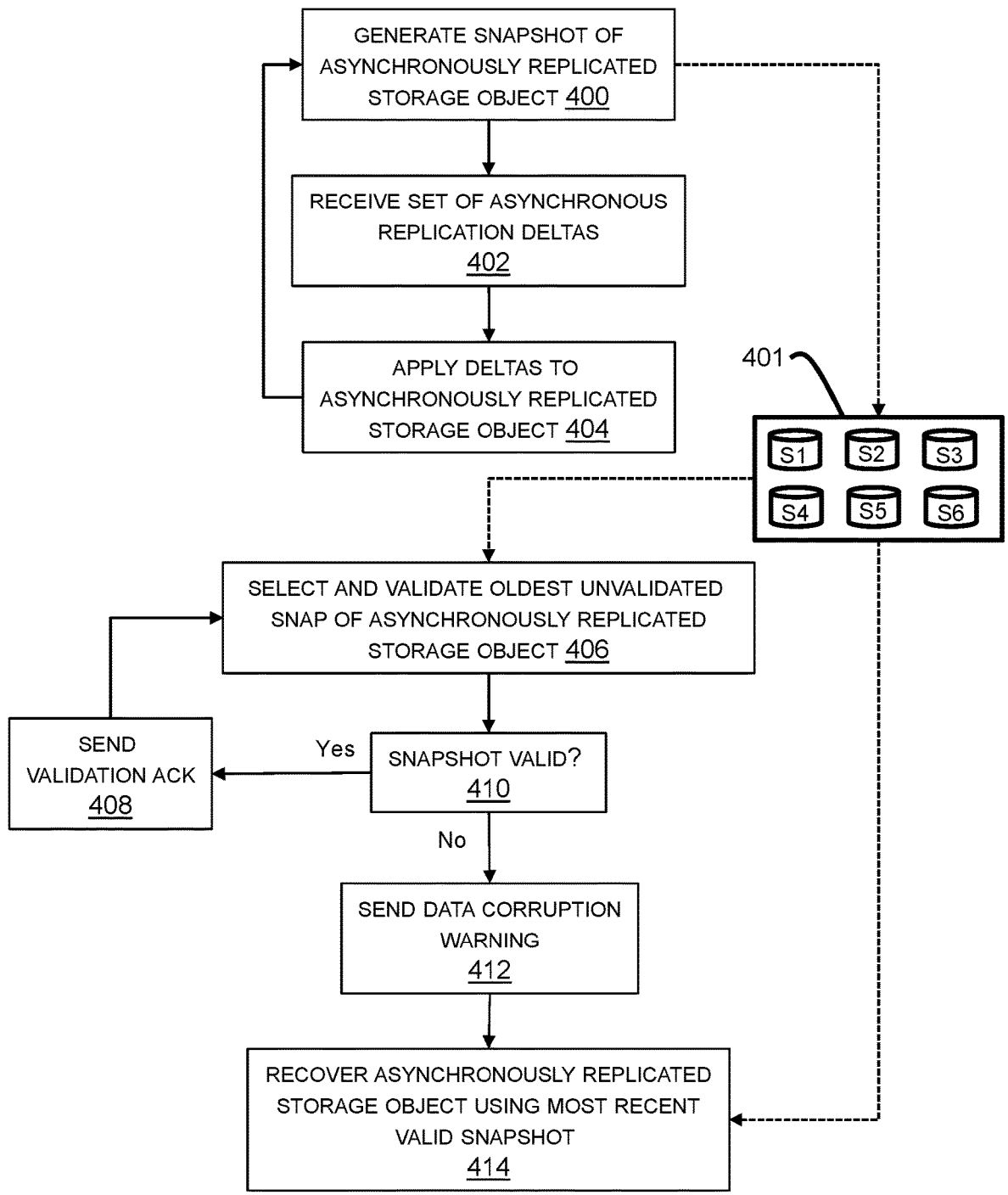
FIG. 4 illustrates a method for validating replicated data.

FIG. 4 illustrates a method for validating replicated data. The method may be independently implemented by the replicated data validator for each asynchronously replicated storage object or storage group. Step 400 is generating a snapshot of the asynchronously replicated storage object. The snapshot is stored in a repository 401, which may be in shared memory and/or the managed drives. Step 402 is receiving a set of asynchronous replication deltas. Step 404 is applying the received deltas to the replicated storage object. Steps 400, 402, 404 are iterated such that snapshots are created before and after each set of deltas is received and applied to the replicated storage object. Step 406 is selecting and validating the oldest unvalidated snapshot from the snapshot repository. As previously described, the selected snapshot is mounted to a host application instance running on a host server and that host application instance is caused to perform validation on the snapshot. If the selected snapshot is determined to be valid in step 410, then step 408 is sending a validation acknowledgement message to the other storage arrays. Steps 406, 410, and 408 are iterated such that snapshots are validated in chronological order independently from the iteration of steps 400, 402, 404, which advantageously decouples snapshot validation processing latency from the application of deltas to the replicated storage object for purposes of replication. If the selected snapshot is determined to be invalid in step 410, then step 412 is sending a data corruption warning to the other storage arrays. Step 414 is recovering the asynchronously replicated storage object using the most recent valid snapshot. Old snapshots that are no longer needed may be discarded in accordance with any of a wide variety of known techniques.

In an alternative implementation, received deltas are applied to a new snap volume that is validated before the deltas are applied to the replicated storage object. Such an implementation avoids applying invalid changes to the replicated storage object, thereby potentially avoiding subsequent recovery procedures at the disaster recovery site. However, snapshot validation processing latency and delta set receipt frequency may have to be similar or matched in order to satisfy asynchronous replication latency constraints and avoid accumulation of unvalidated snapshots in the repository. In the situation in which the asynchronously replicated storage object R3 differs from synchronous replicas R1, R2 by multiple delta sets, and thus multiple snaps that have yet to be validated, the disaster recovery site storage array caused validation of the snaps to be completed and applies the changes to replica R3 before initiating a recovery process.

Specific examples have been presented to provide context and convey inventive concepts. The specific examples are not to be considered as limiting. A wide variety of modifications may be made without departing from the scope of the inventive concepts described herein. Moreover, the features, aspects, and implementations described herein may be combined in any technically possible way. Accordingly, modifications and combinations are within the scope of the following claims.

What is claimed is:

1. A method comprising:
    receiving, from a first or second storage system, a set of changes to an asynchronously replicated storage object, the changes comprising data updates;
    generating an unvalidated snapshot that contains the set of changes; and
    prompting performance of validation on the unvalidated snapshot to detect one or more of data corruption and malicious data encryption.

2. The method of claim 1 further comprising applying the set of changes to the asynchronously replicated storage object prior to generating the unvalidated snapshot.

3. The method of claim 2 further comprising generating the unvalidated snapshot from the asynchronously replicated storage object.

4. The method of claim 3 further comprising performing validation on the unvalidated snapshot using an instance of a host application associated with the asynchronously replicated storage object.

5. The method of claim 3 further comprising performing validation on the unvalidated snapshot using executables of a host application associated with the asynchronously replicated storage object.

6. The method of claim 3 further comprising accumulating a plurality of unvalidated snapshots and performing validation on an oldest one of the plurality of unvalidated snapshots.

7. The method of claim 6 further comprising recovering the asynchronously replicated storage object with a most recent known-valid snapshot responsive to detection of an invalid snapshot.

8. An apparatus comprising:
a plurality of compute nodes than manage access to an array of non-volatile drives on which data of an asynchronously replicated storage object is stored, at least one of the compute nodes configured to receive a set of changes to the asynchronously replicated storage object from a remote storage system, the changes comprising data updates, generate an unvalidated snapshot that contains the set of changes, and prompting performance of validation on the unvalidated snapshot to detect one or more of data corruption and malicious data encryption.

9. The apparatus of claim 8 further comprising the at least one compute node configured to apply the set of changes to the asynchronously replicated storage object prior to generating the unvalidated snapshot.

10. The apparatus of claim 9 further comprising the at least one compute node configured to generate the unvalidated snapshot from the asynchronously replicated storage object.

11. The apparatus of claim 10 further comprising the at least one compute node configured to perform validation on the unvalidated snapshot using an instance of a host application associated with the asynchronously replicated storage object.

12. The apparatus of claim 10 further comprising the at least one compute node configured to perform validation on the unvalidated snapshot using executables of a host application associated with the asynchronously replicated storage object.

13. The apparatus of claim 10 further comprising the at least one compute node configured to accumulate a plurality of unvalidated snapshots and perform validation on an oldest one of the plurality of unvalidated snapshots.

14. The apparatus of claim 13 further comprising the at least one compute node configured to recover the asynchronously replicated storage object with a most recent known-valid snapshot responsive to detection of an invalid snapshot.

15. A non-transitory computer-readable storage medium storing instructions that when executed by a storage array compute node perform a method comprising:
receiving, from a first or second storage system, a set of changes to an asynchronously replicated storage object, the changes comprising data updates;
generating an unvalidated snapshot that contains the set of changes; and
prompting performance of validation on the unvalidated snapshot to detect one or more of data corruption and malicious data encryption.

16. The non-transitory computer-readable storage medium of claim 15 in which the method further comprises applying the set of changes to the asynchronously replicated storage object prior to generating the unvalidated snapshot.

17. The non-transitory computer-readable storage medium of claim 16 in which the method further comprises generating the unvalidated snapshot from the asynchronously replicated storage object.

18. The non-transitory computer-readable storage medium of claim 17 in which the method further comprises performing validation on the unvalidated snapshot using an instance of a host application associated with the asynchronously replicated storage object.

19. The non-transitory computer-readable storage medium of claim 17 in which the method further comprises performing validation on the unvalidated snapshot using executables of a host application associated with the asynchronously replicated storage object.

20. The non-transitory computer-readable storage medium of claim 17 in which the method further comprises accumulating a plurality of unvalidated snapshots and performing validation on an oldest one of the plurality of unvalidated snapshots.

* * * * *